United States Patent [19]
Lara, Jr.

[11] Patent Number: 5,676,044
[45] Date of Patent: Oct. 14, 1997

[54] ROTARY AIR IMPINGEMENT OVEN

[76] Inventor: George A. Lara, Jr., 9403 Crocus Ct., Fort Myers, Fla. 33912

[21] Appl. No.: 582,488

[22] Filed: Jan. 3, 1996

[51] Int. Cl.$^6$ .............................. A23L 1/18; A47J 27/00; A47J 27/026; H05B 6/72
[52] U.S. Cl. ................................ 99/331; 99/330; 99/341; 99/447; 99/451; 99/468; 99/476; 126/21 A; 219/400
[58] Field of Search .......................... 99/330, 331, 447, 99/341, 473–476, 451, 467, 468; 219/400, 401; 126/21 A, 20

[56] References Cited

U.S. PATENT DOCUMENTS

| | | | |
|---|---|---|---|
| 3,529,582 | 9/1970 | Hurko | 126/21 A |
| 3,884,213 | 5/1975 | Smith | 126/21 |
| 4,154,861 | 5/1979 | Smith | 426/466 |
| 4,155,294 | 5/1979 | Langhammer | 99/427 |
| 4,338,911 | 7/1982 | Smith | 126/21 |
| 4,409,453 | 10/1983 | Smith | 219/10.55 |
| 4,438,572 | 3/1984 | Kaminski | 34/218 |
| 4,457,291 | 7/1984 | Henke | 126/21 |
| 4,462,383 | 7/1984 | Henke et al. | 126/21 |
| 4,474,498 | 10/1984 | Smith | 432/144 |
| 4,477,706 | 10/1984 | Mittelsteadt | 219/400 X |
| 4,479,776 | 10/1984 | Smith | 432/144 |
| 4,503,760 | 3/1985 | Pryputsch | 99/447 |
| 4,556,043 | 12/1985 | Bratton | 126/21 |
| 4,591,333 | 5/1986 | Henke | 432/10 |
| 4,626,661 | 12/1986 | Henke | 219/400 |
| 4,701,340 | 10/1987 | Bratton | 426/511 |
| 4,865,864 | 9/1989 | Rijswijck | 426/520 |
| 4,870,254 | 9/1989 | Arabori et al. | 126/21 A |
| 4,873,107 | 10/1989 | Archer | 426/520 |
| 4,940,040 | 7/1990 | Randall | 126/21 |
| 4,951,645 | 8/1990 | Luebke et al. | 126/20 |
| 4,972,824 | 11/1990 | Luebke et al. | 126/21 |
| 5,025,775 | 6/1991 | Crisp | 126/21 |
| 5,097,754 | 3/1992 | Covington et al. | 99/357 |
| 5,107,097 | 4/1992 | Negandhi et al. | 219/400 |
| 5,119,719 | 6/1992 | DePasquale | 99/334 |
| 5,193,444 | 3/1993 | Bar-Sheshet | 99/427 |
| 5,254,823 | 10/1993 | McKee et al. | 219/10.55 |
| 5,329,919 | 7/1994 | Chang | 99/330 X |
| 5,345,923 | 9/1994 | Luebke et al. | 126/21 |
| 5,466,912 | 11/1995 | Dornbush et al. | 219/400 |
| 5,481,962 | 1/1996 | Tedesco | 99/476 X |

*Primary Examiner*—Timothy F. Simone
*Attorney, Agent, or Firm*—Jerry L. Mahurin

[57] ABSTRACT

A combination radiant heat, convection and rotary air impingement closed loop oven comprising an oven housing mounting a removable cooking chamber with a pair of driven spaced apart removable impingement disks. The removable cooking chamber comprising a top and a bottom each having a generally circular opening for receiving a removable driven rotating impingement disk. The disks each comprise a plurality of round edged, generally circular air impingement orifices and a central hub defining a slot. The hub indexes with a pinned drive shaft. The upper disk is quarter turn spring loaded locking and unlocking. The side walls of the chamber removably mount at least one product support surface relatively parallel to the disks. A variable speed fan provides pressurized air to a plenum defined between the housing and the chamber. A heating element or power burner heats the air within the plenum before it is discharged through the impingement orifices in the disks. A front door mounted to the oven housing provides access to the cooking chamber. Dampers disposed in the plenum control air flow and pressure within the plenum and through the orifices. Turning vanes are employed within the plenum to reduce turbulence in the pressurized air. An alternative embodiment employs a radiant element or power burner for browning and heating the surface of a product to be cooked within the oven. Preferably the radiant element is disposed within the plenum above the first impingement disk.

17 Claims, 7 Drawing Sheets

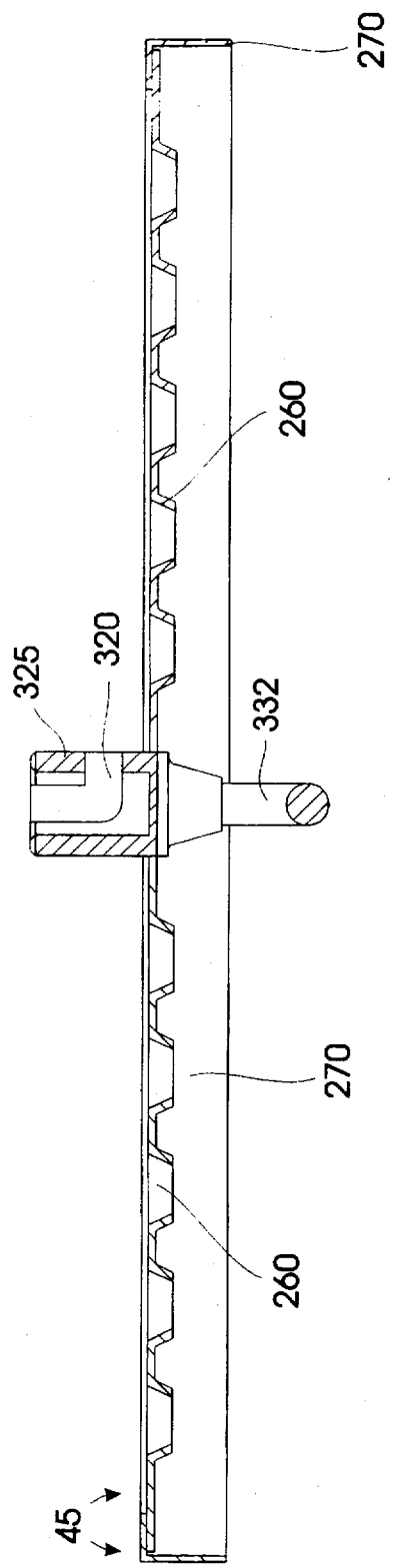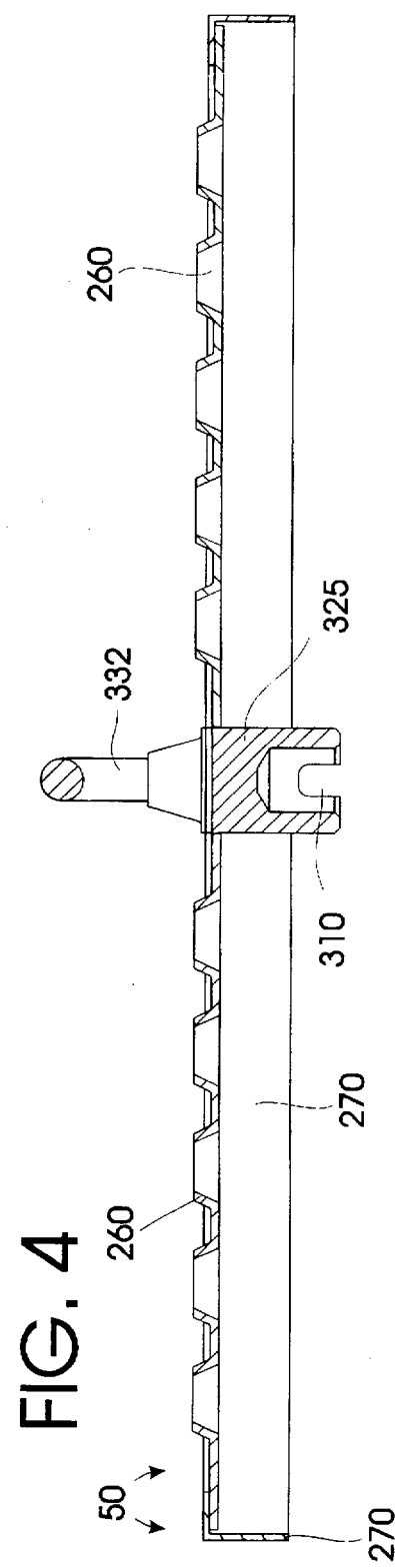

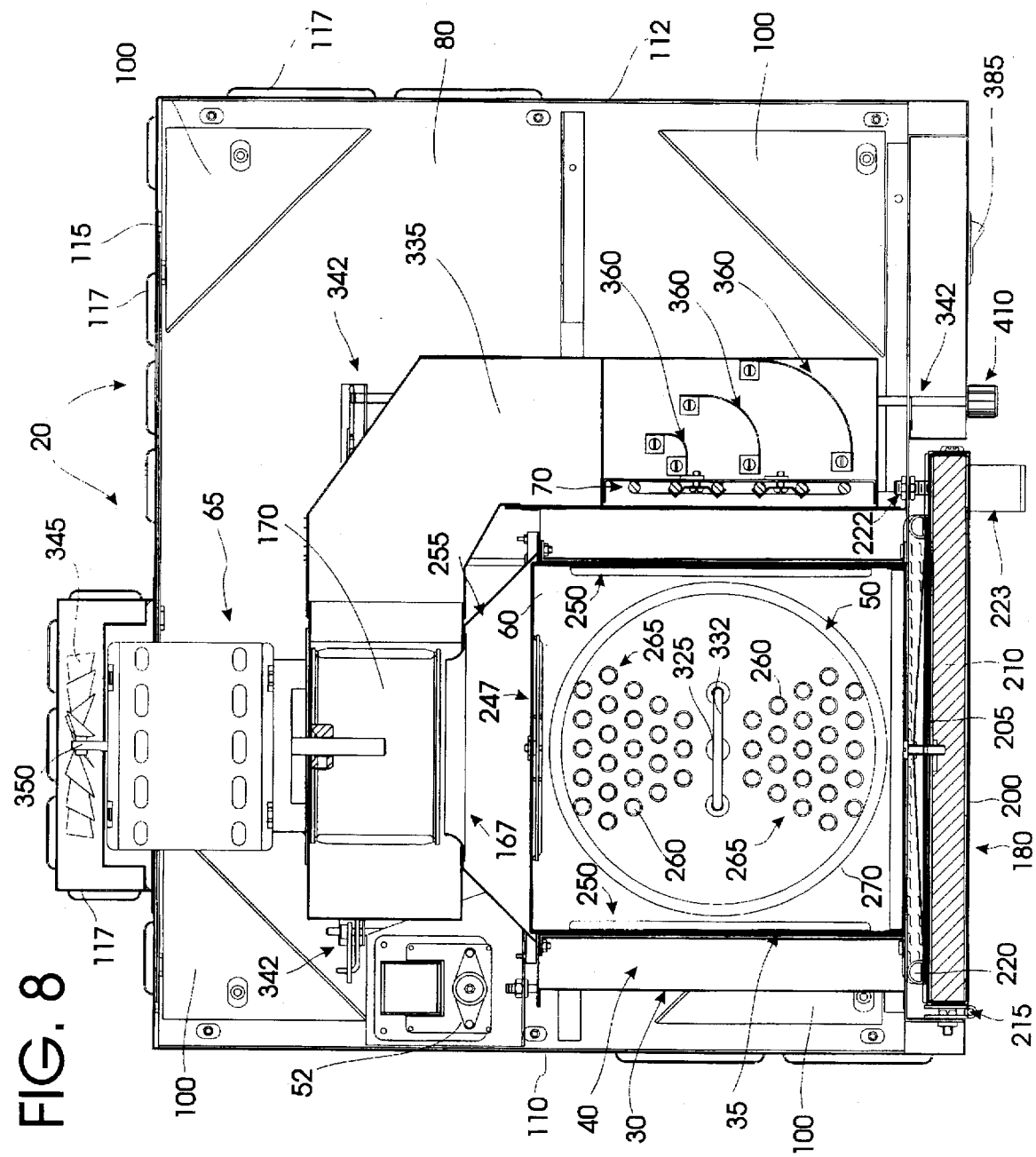

ROTARY AIR IMPINGEMENT OVEN

BACKGROUND OF THE INVENTION

The present invention broadly relates to cooking ovens. Specifically, the present invention is a Rotary Air Impingement Oven. Art pertinent to the subject matter of the present invention can be found in United States Patent Class 126, Subclasses 20 and 20A; and various Subclasses of Class 99, including Subclasses 474, 479, 424, 443R, 447, 448 and 450.

The food industry is one of the fastest growing industries in the United States. Convenience food stores that have been reluctant to change in the past are realizing that selling cook-and-serve food items, unlike pumping gas, has become their number one sector for increasing profit margins. Traditional restaurant floorplans consist of a sizable amount of square footage for equipment space. However, today's fast food outlets are designed for space utility in the food preparation area and maximum seating capacity, resulting in minimum square footage for equipment. Hence, multifunction equipment that is both energy and space efficient with minimum support equipment requirements is needed.

For an oven to prepare a variety of food items that are palatable and pleasant requires that numerous thermal and air flow properties be adequately distributed and controlled in such a way that the physical attributes of appearance, taste, texture, flavor, etc. are enhanced by the cooking process itself. To produce satisfactory products, restaurants have traditionally utilized several different pieces of equipment, each with their own limited range of food applications or sealed for a narrow menu.

A food service operator faces several challenges when offering deep fat fried products on the menu. Food quality and consistency are critical. Problems such as uneven color, oil absorption, and off flavors can quickly turn appealing products into customer complaints. In addition excess fuel, fryer handling for storage and disposal, and filtering costs can decrease the profitability of fried foods. When fat filtering is required at intervals throughout the day, labor requirements may affect promptness in processing orders. Studies suggest that fried products can absorb up to 10–20% of their weight in oil. The costs associated with this equipment and related ventilation and fire suppression systems alone are enough to keep many people out of the food business or to keep current establishments from expanding. Additionally, America has become very diet conscious and is demanding light and healthy foods. Cooking without grease means higher nutritional value and lower cholesterol content.

Steamers are usually used by restaurants for items such as seafood, vegetables, etc. They require a lot of space for internal boiler models or an external hookup boiler.

Numerous patents have been issued on ovens employing forced hot air. Many impingement ovens are of the "tunnel" or "conveyor" type, such as Kaminski, U.S. Pat. No. 4,438,572; Henke, U.S. Pat. Nos. 4,457,291; 4,462,383; 4,591,333; and 4,626,661; Bratton U.S. Pat. Nos. 4,556,043; and 4,701,340; Archer U.S. Pat. No. 4,873,107; Randall U.S. Pat. No. 4,940,040; and Crisp U.S. Pat. No. 5,025,775. Many of the principles taught by these patents are old in the art, such as the need to move either the food of the impingement orifices to prevent spot burning and practical shapes for the air jets.

Conventional air impingement ovens of the continuous conveyor type are suitable for mass cooking volume applications where products have geometric similarity and analogous cooking profile requirements, such as panned products. However, these ovens have a number of shortcomings such as an inability to swiftly vary input conditions without affecting the adjacent products located on the conveyor. This presents a problem for quality consistency between two products requiring different cook rates. Also, the open atmospheric design of these ovens results in expulsion of heat into their kitchen environment adding unnecessarily to cooling load requirements, as well as worker discomfort. Additional residue heat is radiated due to these ovens' large exposed surface areas, convection load and radiation load. Cleaning is frequently a problem with many of these ovens. Due to the labor intensive nature of disassembling the large number of components, equipment down time to do a proper sanitary job is impractical for frequent cleaning. Hence, it is impractical for some food service operators to adequately clean and sanitize a large conveyor impingement oven more than once a year.

More efficient ovens employ a closed system. A standard convection oven involves considerable cost when one has only a small volume to cook. Pre-heating and maintaining temperature contributes unnecessary energy expenses for cooking. Negandhi, U.S. Pat. No. 5,107,097 discloses a convection oven with generally circular tray holders $71a$–$d$ which are rotated about a central vertical axis.

Ovens utilizing microwave power combined with air impingement have been considered effective for preparation of some specific foods. However, they have limited capability regarding good finish quality of many foods, particularly those typically cooked in a deep fat fryer. Products cooked by microwaves alone are usually dehydrated and lack good surface finish and texture. Also, breaded products loose crispness due to moisture migration. Surface heating is necessary to regain crispness. Additionally, some people cannot use them because of their form of energy emittance due to pacemakers and the like. McKee, U.S. Pat. No. 5,254,823 discloses a "hybrid" impingement and microwave oven.

Some closed system ovens move the food in a manner differing from the conveyors discussed above. For example, Langhammer, U.S. Pat. No. 4,155,294 discloses a rotating basket for holding food. Rijswijck, U.S. Pat. No. 4,865,864 is another hot air oven which uses a basket rotated about a horizontal axis to tumbled food. Covington, U.S. Pat. No. 5,097,754 discloses a hot air cooking system for a vending machine, primarily intended to cook and dispense french fries. DePasquale, U.S. Pat. No. 5,119,719 is a brick pizza oven which discloses a turntable made of brick to support and transport food.

Some impingement cooking systems employ movement of the oven element defining the impingement orifices. U.S. Pat. Nos. 4,503,760 and 5,193,444, disclose use of a rotating air impingement drum.

Luebke, U.S. Pat. Nos. 4,951,645; 4,972,824; and 5,345,923 disclose closed system impingement ovens with an associated griddle.

Numerous air impingement oven patents have issued to Smith. Many are Continuations or Divisional applications. The earliest application appears to have matured into U.S. Pat. No. 3,884,213. Later patents include U.S. Pat. Nos. 4,154,861; 4,338,911; 4,409,453; 4,474,498; and 4,479,776.

Smith U.S. Pat. Nos. 3,884,213 (column 10 lines 65 through 68); 4,154,861; 4,338,911 and 4,409,453 all include a paragraph that states:

"Another simple structure for accomplishing such result involves forming jet plate 124 in the configuration of a disc which can be rotated causing jets 81 to sweep across the surface of the Product P."

However, the aforementioned Smith references only disclose various rectangular plat configurations employing orifices having a variety of cross sections and are largely concerned with conveyor type impingement oven configurations.

It has long been established by heat transfer, fluid mechanics, and agricultural food process engineering that heat energy is transferred by three mechanisms: convection, conduction, and radiation. In many systems all three operate simultaneously. Superficial consideration of such systems has often yielded rule-of-thumb expressions that are obviously simple, but which have a limited range of application. Sound analysis of impingement cooking requires a recognition of the part played by each mechanism in the application of jet stream flow and in the processing of many food products.

Almost all ovens utilize a convective heat process to cook food. Air impingement is a convective process. It is well known that the principle resistance to heat transfer to a surface is found in a relatively stagnant laminar layer, without mixing moving, adjacent to the surface and an adjacent turbulent zone of fluid at the solid-fluid interface. The heat transfer rate is proportional to the difference in temperature between the surface and the main bulk and to the surface area. In a convective process, heat can only be transferred through this layer by conduction in the fluid. The surface thermal conductance (heat transfer coefficient) is determined by the properties of the fluid, the nature of the surface, and the manner and velocity of the fluid flow past the surface. The conductance can be increased by reducing the thickness of the laminar layer by more vigorous agitation, more thermal circulation, or by operation at a higher Reynolds-number value.

It has been experimentally proven in general engineering practice and supported by numerous fluid dynamics articles dating back to the early 1900's, that an air inlet size and shape affects the velocity and volume of air emerging from a thin plate orifice as well as the jet stream characteristics of that air. It has also been experimentally proven that for an orifice with a well rounded smooth edge there is no contraction or "vena contracta effect" beyond the orifice itself. Since there is no contraction, the coefficient of velocity equals the coefficient of discharge. The actual discharge of the air outlet performance through a rounded smooth edge orifice is thus about 97% of the theoretical discharge as opposed to 60% for sharp edge orifices. Also, this orifice shape is economical to manufacture. Round edge orifices can be effectively formed by methods such as soft-tooling pierce and extrude; pierce and draw; or hard-tooled compound dies combining both operations.

Another problem with many current impingement ovens is that they rely heavily on convection heat transfer as the main mechanism for heat. Therefore, to properly brown foods without overcooking the interior, products must be cooked longer at lower temperatures. Most of the radiant energy supplied to the food products comes from opaque surfaces and the reflected or incidence radiation. Radiation is known to have a significant effect on the transfer of heat through porous product. Equally important to the finishing characteristics of products is achieving a proper balance in radiant exchange.

It is well known that radiation differs from both convection and conduction in that it does not depend on the presence of intermediate matter as a carrier of the energy. When radiation is absorbed by a body such as a food product, the energy transfer is evident by a rise in molecular activity and consequent rise in temperature of the absorbing food product. Since radiant energy heats the product directly without an intervening heat transfer medium such as air, radiant heating of the products surface can be much faster than convection heating. In contrast to conduction and convection, radiant heat transfer increases rapidly with an increase in temperature level.

It should be appreciated by those skilled in the art, that a closed system oven which has the unlimited ability to cook virtually any product a convection oven, micro-wave, deep fat flyer, steamer, or broiler has an enormous advantage over traditional cooking equipment. Additionally, the ability to prepare fried foods without the aid of grease or oil and eliminating the cost and maintenance is desirous. It should also be appreciated that an oven which will allow an operator to cook both flies and fish in the same cooking cycle with no flavor overlap could greatly reduce capital outlays for a restaurant that traditionally require designated fryers for each product.

Hence, it is desirous to provide a relatively compact closed system impingement oven which is capable of cooking food products to a quality and finish consistent with traditional cooking equipment such as a deep fat fryer, convection oven, steamer, rotisserie, broiler, conveyor impingement oven, or microwave. Further, it is advantageous to cook products employing multiple heat transfer modes for fast and efficient cooking.

SUMMARY OF THE INVENTION

My Rotary Air Impingement Oven utilizes a sealed closed loop continuous rotary air impingement process with optionally available direct infrared radiation heat transfer to provide high speed batch cooking, reconstituting crisping, and/or browning of food products. My oven enables a food operator to expand the number of menu items by supplanting multiple pieces of menu item specific equipment with a single piece of versatile equipment.

My oven comprises a removable cooking chamber disposed within an oven chamber defining a plenum therebetween. A pair of spaced apart, opposite facing, removable rotating disks with a plurality of strategically located round edge orifices for discharging superheated recirculated air are disposed within the top and bottom of the cooking chamber. The air is conveyed to the disks through the high pressure, low velocity plenum into the low pressure, high entrance air velocity cooking cavity by a centrifugal fan with a variable speed air cooled motor and related ductwork. A heating element or power burner in the plenum heats the air prior to discharge through the impingement disks. A damper system controls the flow or air through the plenum, allowing an operator to reduce or eliminate air flow to the lower impingement disk. A removable door is hinged to the oven housing to selectively seal against the front of the housing and allow access to the cooking chamber. The rotating disks are displaced equally above and below the cooking cavity for promoting optimum air exchange and uniform air distribution across the top and/or bottom of the products largest surface area. The products are positioned on centrally located cooking trays in the cooking cavity. An alternative embodiment employs a radiant heating element disposed within the plenum above the upper impingement disk to facilitate browning of food product within the cooking chamber.

My oven is a healthy cooking system which prepares traditional fried foods in a grease-less medium and will reconstitute foods to around 350° F. in seconds. This means that products such as fries can be pre-cooked to meet volume demands ahead of time and reheated quickly to serve at peak demands. Also, unlike fryer prepared items, food can be re-heated several times without product deterioration.

My invention can optionally simulate the results of a pressureless steamer with reduced cooking times and minimize shrinkage loss due to moisture migration and dehydration. The internal humidity can be increased which in turn will promote higher heat transfer coefficients and enthalpy values for faster cooking than a non-humidified environment or any equipment with an open atmospheric environment.

My novel rotary impingement oven takes into account the physical laws pertinent to the mechanisms of convection, conduction and radiance. It directly accomplishes the variable control of convection by controlling speed, temperature and turbulence of impinging air for cooking a wide range of foods. To achieve maximum flow efficiency and to minimize pressure head losses, my oven incorporates circular rounded edged impingement orifices. The heater used in my oven has a higher watt density so that the heater sheath temperature operates in a range that results in peak energy wavelengths being emitted in the medium to far infrared electromagnetic spectrum which can be well absorbed by the product.

Therefore, a primary object of the present invention is to provide a Rotary Air Impingement Oven for rapidly cooking products.

Specifically an object of the present invention to provide a novel oven for batch cooking of food products wherein impingement of a heated gaseous medium such as air is applied to food products via upper and lower rotating impingement disks having a plurality of smooth, round edge orifices for even cooking of the food product quickly and economically.

A further object of the present invention is to utilize disk orifices with spacing, size and location that result in the expanding cone jet velocity profile and angle of dispersion of the heated air of one orifice enveloping the jet of the adjacent orifice at a precise throw point.

Another object of the present invention is to provide a rotary air impingement oven in which the jet expansion zones and center line air velocities can be varied or shifted to match a variety of food products based on their different geometrical shapes and specific heat value requirements.

Another object of the present invention is to provide a rotary impingement oven which utilizes three heat transfer mechanisms; infrared radiant energy, forced convection and conduction; simultaneously in a rotary air impingement process.

It is yet another object of the invention to provide a rotary impingement oven in which the major food cooking zones can be disassembled without tools for cleaning quickly and easily A related object of the present invention is to provide a rotary impingement oven having an interior cooking cavity and other parts that can be cleaned and washed in a dishwasher.

Another object of the present invention is to provide a rotary impingement oven which is capable of cooking a broad variety of restaurant and fast food products with quality consistent with products cooked in a traditional manner.

A related object of the present invention is to provide a rotary impingement oven which is capable of cooking food products to a quality and finish consistent or superior to cooking with traditional equipment such as a deep fat fryer, convection oven, steamer, rotisserie, broiler, conveyor impingement oven, or microwave.

Another object of the present invention is to provide an oven which simultaneously, efficiently utilizes a rotary air impingement process in conjunction with an infrared heating process to promote preheating, additional surface heating of a product and browning of food products as needed.

A related object of the present invention is to provide a rotary impingement oven which employs a highly reflective cooking chamber to promote browning of food products.

An object of the present invention is to provide an impingement oven which employs static regain areas on the high air pressure side of the impingement orifices to provide uniform impingement on the low pressure side of the impingement orifices.

Another object of the present invention is to provide a rotary impingement oven which employs dampers to control impingement air flow, volume and, pressure.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is an enlarged fragmentary cross sectional view of the upper impingement disk;

FIG. 4 is an enlarged fragmentary cross sectional view of the lower impingement disk;

FIG. 8 is a fragmentary cross sectional view from the top of my oven, showing the relationship of various elements, with portions omitted for clarity;

DETAILED DESCRIPTION

Figure 1:
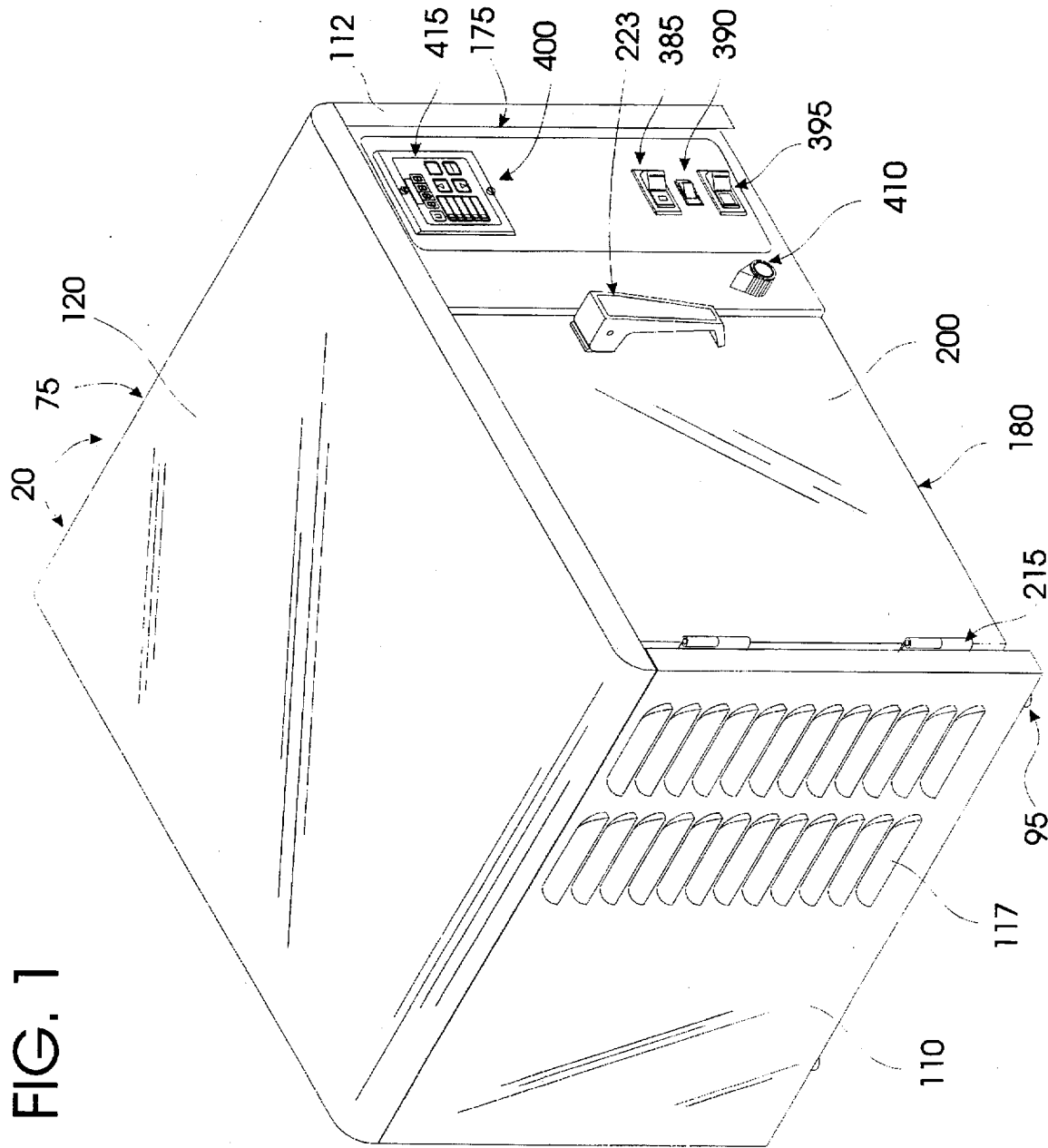
FIG. 1 is a exterior isometric view of a my Rotary Air Impingement Oven.

With reference now to the accompanying drawings, the preferred embodiment of my Rotary Air Impingement Oven is broadly designated by the reference numeral 20. My oven 20 is a closed loop impingement oven. The preferred embodiment also promotes convection cooking. An alternative embodiment employs a radiant browning element or power burner as illustrated throughout the drawings. Additionally, the aforementioned alternative embodiment could employ reflective surfaces within the oven 20 to further promote the browning of food with or without the use of radiant elements or power burners.

My oven 20 is comprised of an oven housing 30, with a cooking chamber 35 captivated within, an air flow plenum 40 is defined between the housing 30 and the cooking chamber 35. The cooking chamber 35 comprises a pair of rotating air impingement disks 45 and 50 driven by gearmotors 52. An upper impingement disk 45 is mounted in alignment with the top 55 of the cooking chamber 35, and a lower impingement disk 50 is mounted in alignment with the bottom 60 of the cooking chamber 35. A fan 65 and heater 70 within the plenum 40 provide pressurized, heated air to the disks 45 and 50. An exterior oven body or casing 75 of stainless steel covers the oven housing 30. An alternative embodiment employs a radiant heating element 72 disposed within the plenum 40 above the upper impingement disk 45 to promote surface browning of food within the cooking chamber 35.

The exterior casing 75 of my oven 20 is preferably constructed of a durable, easily cleaned and sanitized material such as stainless steel. The casing 75 is comprised of a base 80 having an access panel 85 to allow rapid access to the drive 90 for the lower impingement disk 50. Adjustable leveling legs 95 are threaded into the base 80, at the corners. These corners are reinforced with stiffener gussets 100. The side walls 110 and 112 and back 115 of the casing 75 define vents 117 for providing relatively cool external air for cooling the fan motor 65. The top 120 of the casing 75 is a single solid piece, removable to allow access to the drive mechanism 90 for the upper impingement disk 45 and fan motor 65. The exterior casing 75 facilitates counter top use. For modular, slip-in, or built-in installations, such as galleys or RV's, the casing 75 can be abbreviated or eliminated entirely.

The oven housing 30 is comprised of an integral, single piece top 125, bottom 130 and closed side 135; an open side 140; a generally open front 145; and a rear wall 150. The open side 140 mounts the convection heater 70 used to heat the air within the plenum 40. The rear wall 150 mounts a blower housing 155 which in turn mounts a variable speed blower motor 65. A relief 160 is defined in the housing rear wall 150 aligned with the cooking chamber 35. An air intake 165 is defined in the rear wall 150 to allow air from the cooking chamber 35 to be drawn by the fan motor's impeller 170. The control panel 175 and the door 180 of the oven mount to front of the housing 30. An opening 185 defined in the front, aligned with the door 180 also receives the cooking chamber 35 on a set of guide rails 190, 192, 194 and 195. A sealing edge 197 is defined around the front opening 185. Insulation 199 blanketed around the oven housing 30 reduces heat transfer to the motors 65, 90 mounted outside the housing 30, within the casing 75, and to aid in maintaining the exterior casing 75 temperature.

A front door 180 comprising an outer panel 200 and an inner panel 205 and an insulated cavity 210 between is mounted on hinges 215 secured to the front edge of the oven housing. A seal 220 is disposed around the periphery of the inner panel 205 to seal against the sealing edge 197 on the front 145 of the oven housing 30. A door switch 222 mounted to the front 145 of the oven housing 30 to interrupt operation of the impingement disks 45 and 50 when the door 180 is opened. A handle 223 is mounted to the front of the door 180 to release the bullet latch 224 which holds the door 180 in the closed position.

The cooking chamber 35 is supported and aligned within the oven housing 30 by the front 145 of the oven housing 30 and the guide rails 190, 192, 194 and 195 which extend between the front 145 and rear wall 150 of the oven housing 30. The cooking chamber 35 is an integral unit having a top 55, bottom 60, side walls 235 and 240 and a rear wall 245. The front is open to allow access through the oven door 180.

The top 55 has a circular opening to receive the upper impingement disk 45. The bottom 60 defines a similar circular opening to receive the second, lower impingement disk 50. The rear wall 245 also defines an air intake 247 in alignment with the air intake 165 defined in the rear wall 150 of the housing 30. A low pressure area 255 is maintained between the rear wall 150 of the housing 30 and the rear wall 245 of the cooking chamber 35 during operation. As mentioned above the cooking chamber 35 may have a reflective surface. Therefore, to promote cleaning and sanitation as well as the reflective effect, the cooking chamber 35 is preferably constructed of stainless steel, as well. A highly reflective stainless steel such as "430" polished stainless steel, which has low emmisivity for high reflectivity, can be used to increase the total radiosity of the element 72. Pairs of supports 250 are mounted to the side walls 235 of the cooking chamber 35. The supports 250 hold removable cooking trays 255. These trays 255 support the food to be cooked within the oven 20. The trays 255 are disposed generally parallel to the impingement disks 45 and 50 above and below. These trays 255 may be solid, perforated or mesh. Thus, respectively, blocking, impeding or allowing passage of impingement air from below. Preferably, multiple support sets 250 will be employed to mount at least two trays 255 to promote efficient simultaneous cooking and/or to allow the distance between the product and the impingement disks 45, and 50 to be adjusted to accommodate the shape and consistency of the product being cooked. In the alternative embodiment employing a radiant heating element 72, the food product can be moved upward toward the radiant element 72 for broiling.

Figure 2:
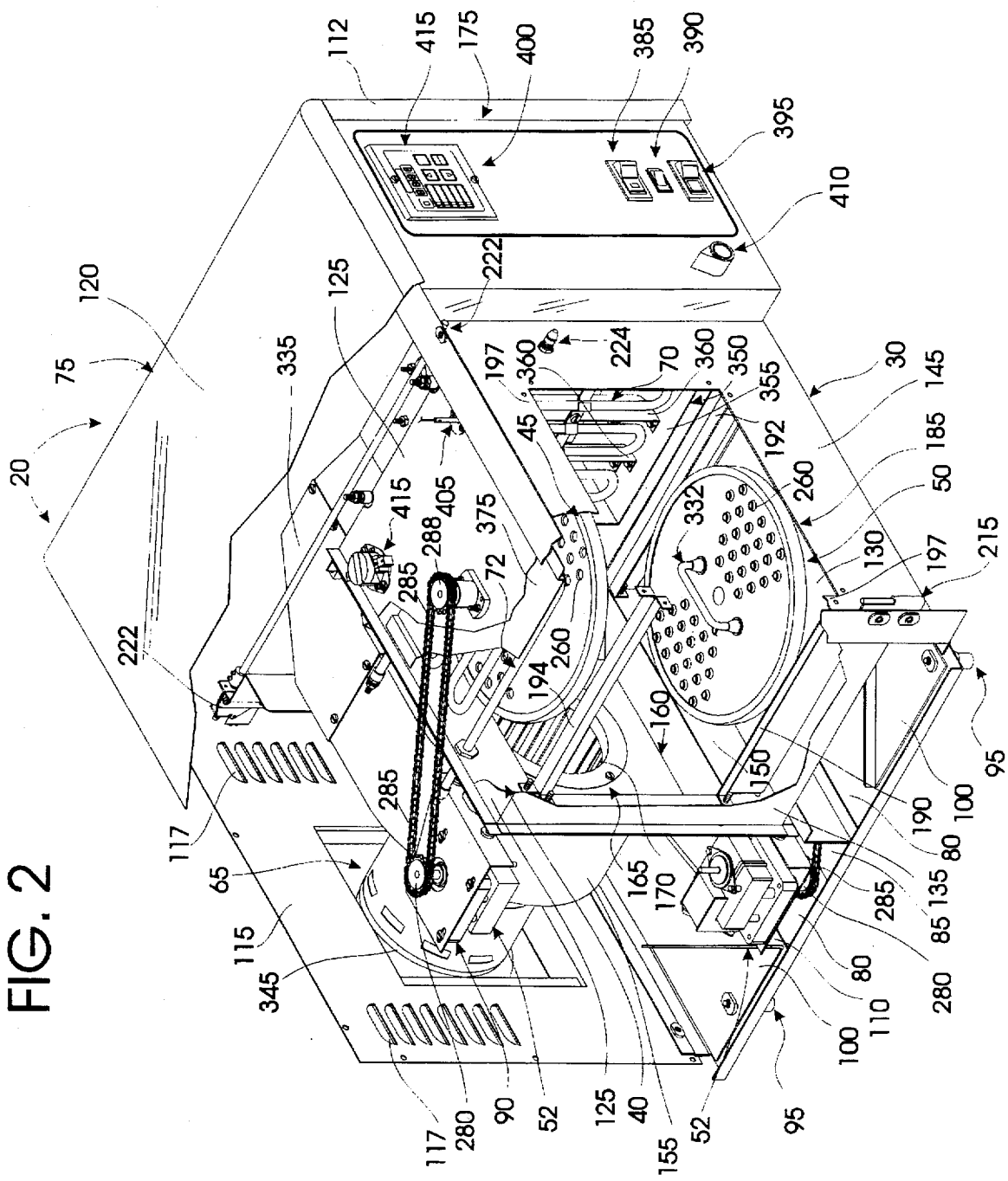
FIG. 2 is a fragmented isometric view of the preferred embodiment of my oven with portions omitted for clarity, specifically the cooking cavity.
Figure 5:
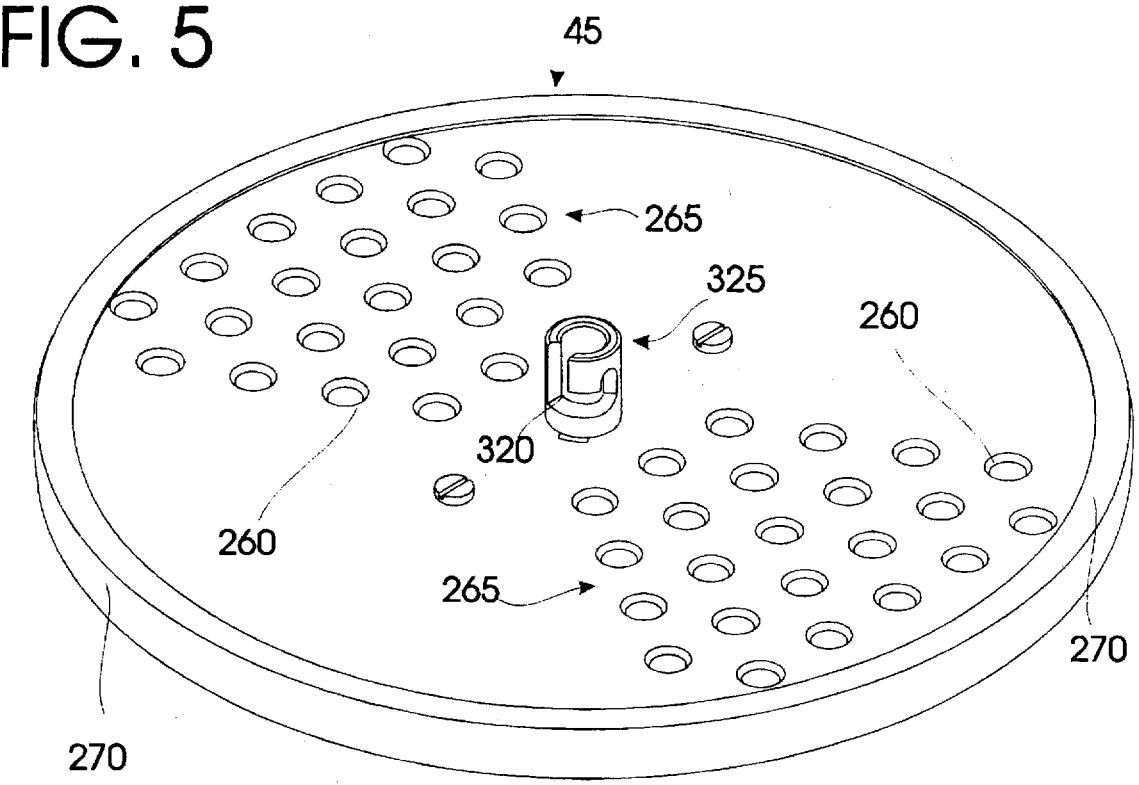
FIGS. 5 and 5A are enlarged free body isometric views illustrating the spatial relationship of the impingement disks.
Figure 5A:
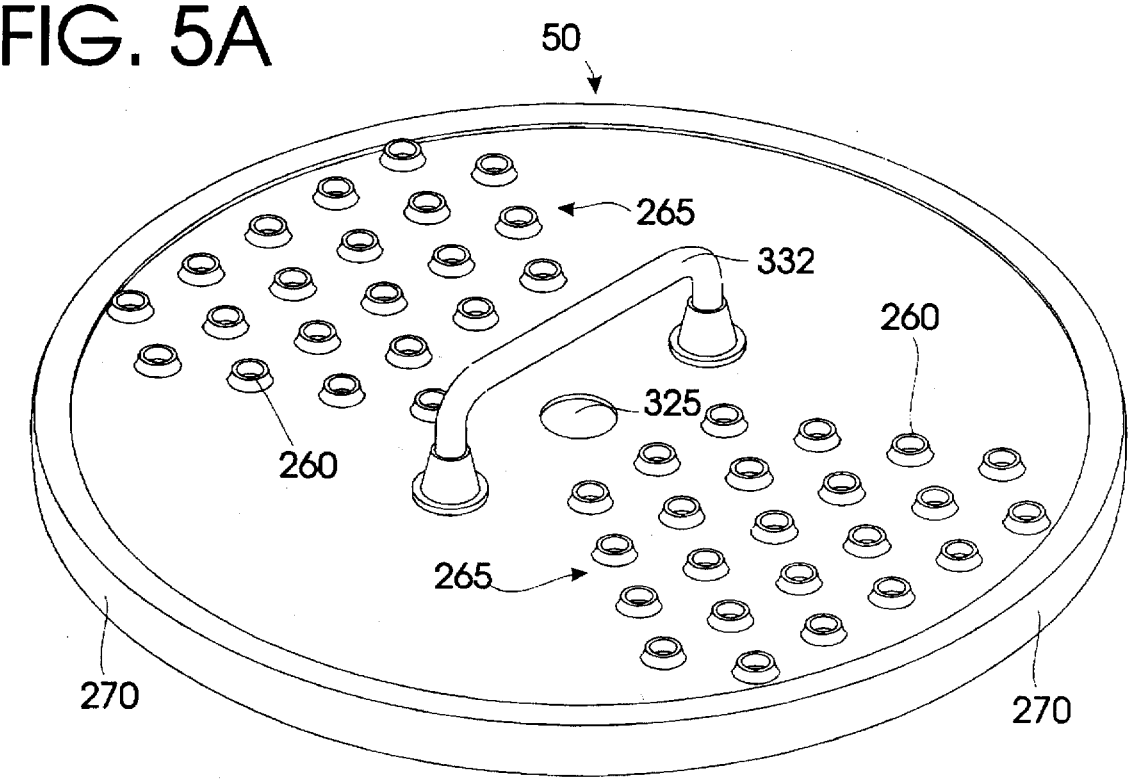
Figure 6:
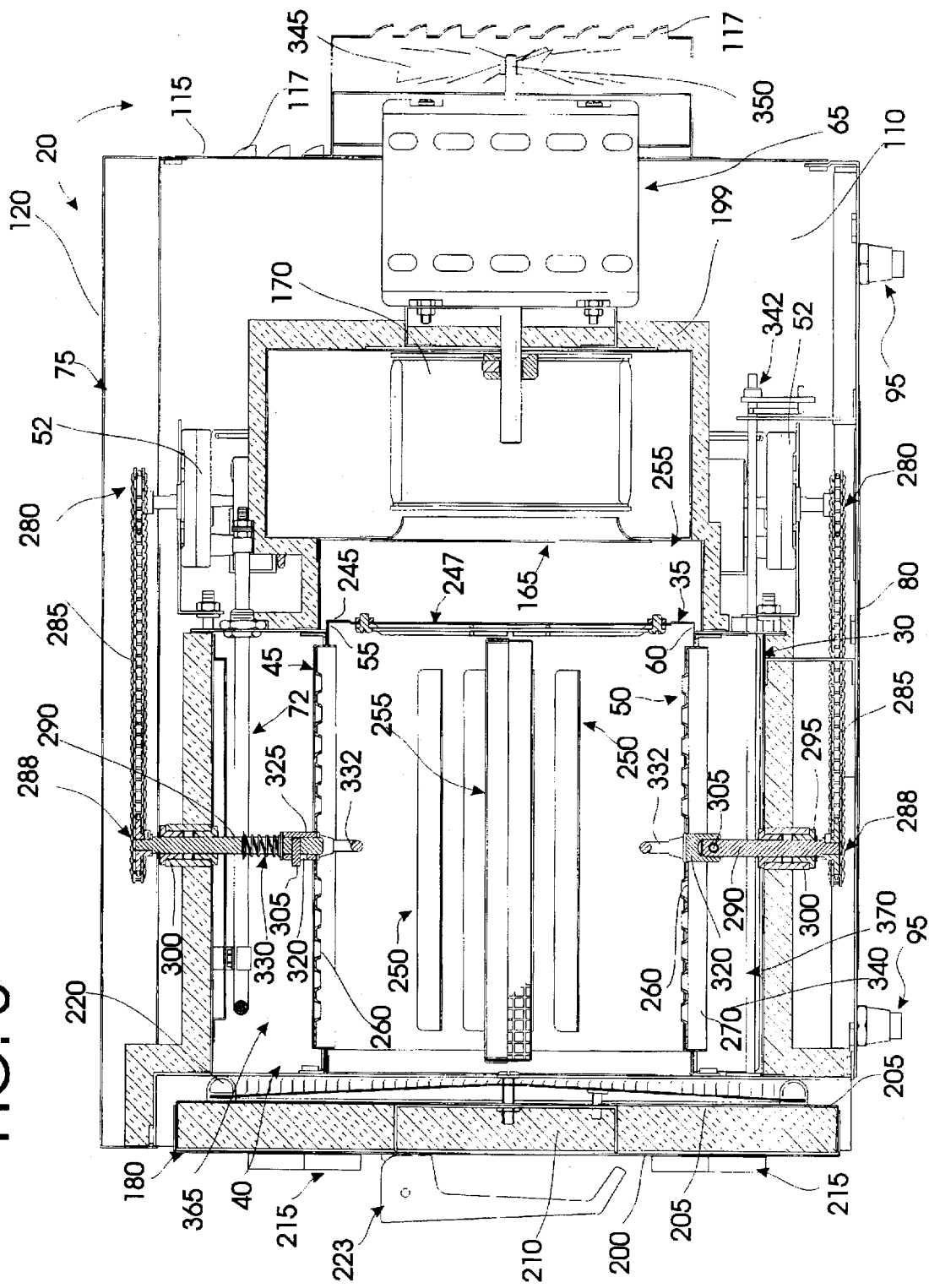
FIG. 6 is a fragmentary cross sectional view from the side of my oven, showing the relation of various elements, with portions omitted for clarity.
Figure 7:
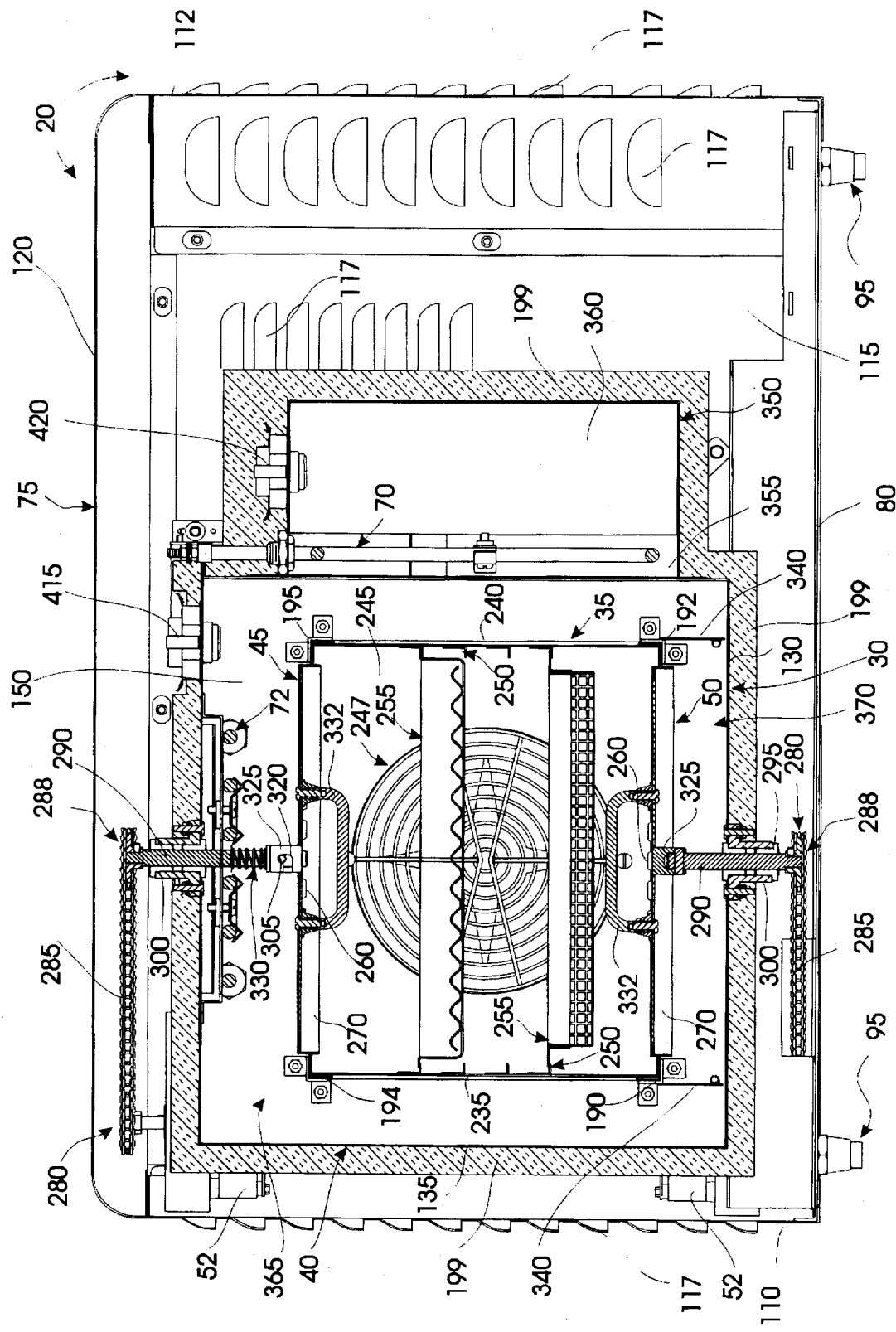
FIG. 7 is a fragmentary cross sectional view from the front of my oven, showing the static regain areas, with portions omitted for clarity.

The impingement disks 45 and 50 are generally circular defining a plurality of impingement orifices 260. As illustrated in FIGS. 2 and 5 a set of orifices 260 are preferably disposed in opposite sectors 265 of each disk. With attention now directed to FIGS. 3 and 4 one will see that the periphery of the disks 45 and 50 define a reinforcement sealing lip 270. As illustrated in these cross sectional views the orifices 260 defined a converging nozzle, having a generally conical cross section to provide laminar air flow. This orifice shape facilitates standardized manufacturing and tooling punch availability. Round edge orifices 260 can be effectively formed by methods such as soft-tooling pierce and extrude; pierce and draw; or using hard-tooled compound dies combining both operations. The spacing, size and location of orifices 260 in the disks 45 and 50 are arranged so that the expanding cone jet velocity profile and angle of dispersion of the heated air of one orifice envelopes the adjacent orifice at a precise throwpoint which corresponds to a definite maximum average uniform centerline velocity relative to location of the cooking trays 255. Additionally, the jet expansion zones can be varied or shifted to match a variety of food products based on their different geometrical shapes and specific heat values by exchanging disks 45 and 50.

Each impingement disk drive 90 is comprised of a gearmotor 52, mounting a sprocket 280, a drive chain 285 and a disk sprocket 288. The gearmotors 52 are located between the outer casing 75 and the oven housing 30 away from the heat within the plenum 40. Disk drive shafts 290 extend inward from the disk sprockets 288 through seal 295 and bearing 300 assemblies mounted to the top 125 and bottom 130 of the oven housing 30. The impingement disks 45 and 50 mount to these drive shafts 290. The lower disk 50 is held in place by its weight and indexed to the shaft 290 by a pin 305 extending from the shaft 290 and a slot 310 in the hub 315 of the disk 50. The upper disk 45 is held in place by a pin 305 extending from the shaft 290 indexed to a J-shaped slot 320 in the hub 325 of the disk 45 and a spring assembly 330 disposed on the shaft 290. The upper disk pin 305, slot 320, and spring assembly 330 provide a convenient quarter turn spring loaded release using handle 332 for easy disassembly and cleaning.

A hot air plenum 40 is defined between the oven housing 30 and the cooking chamber 35. This plenum 40 is pressurized by the blower motor 65 via a blower housing 155 and an outlet elbow 335. The air is heated by the heating element 70 or power burner within the plenum 40 before discharge through the impingement disks 45 and 50. Dampers 340 disposed within the plenum 40 control air flow within the plenum 40 and through the impingement disk orifices 260. A lower damper 340 is located within the lower portion of the plenum 40. It extends longitudinally across the lower portion of the plenum 40 to regulate air flow to the lower impingement disk 50, as food cooking profiles may dictate. When the damper 340 is closed via linkage 342, it impedes air flow to the lower impingement disk 50 and raises the static pressure within the plenum 40, above the upper disk 45. When open it allows air flow to the lower disk 50 and relatively equalizes the static pressure above the upper disk 45 and below the lower disk 50, within the plenum 40.

The blower motor 65 is cooled by a cooling impeller 345 mounted to a shaft 350 extending from the rear of the motor 65. This cooling impeller 345 draws air through the vents 117 defined in the exterior casing 75.

A high wattage convection heating element 70 or power burner is used to heat air within the plenum 40. The element 70 is disposed within a diffusion assembly 350 comprising an outer box 355 and air turning vanes 360 disposed in the box 355 to reduce dynamic losses. The air undergoes static regain within the plenum 40, in static regain areas 365 and 370, above the upper disk 45 and below the lower disk 50 prior to discharge through the impingement disk orifices 260, respectively.

In an alternative embodiment, a second set of relatively lower wattage but relatively higher watt density browning elements 72 are mounted in the plenum 40 directly above the upper impingement disk 45. These elements 72 focus more direct infrared radiation into the cooking chamber 35, onto the product surface to promote faster pre-heating, quicker food surface temperature elevation and browning. These elements are backed by a heat shield 375 made of a reflective material such as "430" polished stainless steel. This shield promotes radiosity of the elements 72 by reflecting heat back on to the elements as well as on the product below. Also, heat is reflected inward away from the motors 65 and 52 disposed outside the oven housing 30.

Preferably, the control panel 175 for the oven 20 is conveniently mounted to the front of the oven housing 30, adjacent the door 180. The controls may be digital or analog. The controls include switches to turn the oven on and off 385, to control fan speed 390 and to control the browning element 395. Temperature is controlled via a thermostat or digital controls 400 interconnected to a thermocouple 405 disposed within the oven 20. Indicator lights indicate heater element 70 and browning element 72 operation. The dampers 340 are controlled by a knob 410 or via a switch. The illustrated knob 410 actuates a mechanical linkage 342 to control the dampers. If a damper switch is employed, it controls the dampers 340 via solenoids. Additional control is provided by limit switches 415 and 420 mounted in the housing 30 and the diffusion assembly 350 to prevent over heating of the elements 70 and 72 and air within the plenum 40.

Operation

When the power switch 385 is switched to an "ON" position, an indicator light on the power switch will come on and fan 65 will be activated on either "low" or "high" speed based on the speed switch 390 setting. Assuming the door 180 is closed and the door switch 222 is activated, both the upper and lower air impingement disks 45 and 50 will begin rotating. To set a pre-heat temperature the thermostat knob 400 is set to the desired cooking temperature. The indicator light above the thermostat comes on indicating that the heater 70 or heaters 70 and 72 are energized. If the "BROWNING" switch 395 is set to the "OFF" position only the main convection heater 70 will be activated. To shorten the warm-up period the "BROWNING" switch 395 can be set to the "ON" position to activate the radiant heater 72. The thermostat 400 activates both heaters simultaneously when the browning switch 395 is in the "ON" position.

During warm up the "DAMPER" control knob 410 should be set to the wide open position. The damper 340 can be closed once product is loaded for cooking if bottom air impingement is not necessary.

When the oven reaches the desired pre-heat temperature the thermostat indicator light will go off and the oven 20 is ready to load product for cooking. The "BROWNING" switch 395 should be set to the "OFF" position if the product does not require radiant cooking or browning. The "DAMPER" knob 410 is set to the "OPEN or CLOSED" as desired to control air flow to the lower impingement disk 50.

When the door 180 is opened, to place a cooking tray 255 with product on it in one of the four rack positions 250, the fan 65 will remain activated but the rotating air impingement disks 45 and 50 will cease to rotate for user safety until the door 180 is closed. The fan motor 65 remains active when the door 180 is open to maintain the temperature throughout the plenum 40 and cooking chamber 35 to reduce recovery time once the door 180 is closed. However, due to a slight negative pressure within the cooking chamber 35 little heated air should escape from the oven 20. The timer 415 is set to the desired cooking time. The indicator light above the timer or the digital readout will indicate that the cooking cycle has begun. The timer indicator light will turn off or the timer count down and an audible alarm will be activated alerting the user to remove the food. Food will continue to cook at the oven set temperature until the unit is turned off or food removed. The timer 415 does not disable the heating elements 70 and 72.

Various components of my oven 20 can be varied or shifted to match a variety of food products based on their different geometrical shapes and specific heat values. For example, the impingement air speed can be varied using the fan speed switch 390. Air volume and pressure can be manipulated using the damper 340. The cooking trays 255, within the cooking chamber 35 can be moved to one of four positions 250 at varying distances from the impingement disks 45 and 50. The impingement disks 45 and 50 can easily be removed and replaced with disks 45 and 50 of varying configuration; more or fewer orifices 260; larger or smaller orifices 260; closer or further spacing between orifices 260.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense. For example, an internal boiler injector can be disposed within the oven housing 30 or the cooking chamber 35 and electronically or manually controlled at the control panel 380 to provide steam cooking, to control humidity for desired moisture content and/or to minimize shrinkage due to moisture loss. Another modification could employ infrared sensors to automatically control convective and radiant cooking at different times in the cooking cycle and/or to automatically adjust cooking tray 255 position to alter radiant view factors.

What is claimed is:

1. A rotary air impingement oven comprising:
   an oven housing;
   an interior cooking chamber comprising at least one product support surface;
   a hot air plenum defined between said oven housing and said cooking chamber;
   variable speed fan means for providing pressurized air to said plenum;
   heater means for heating said pressurized air
   said cooking chamber comprising a first driven rotating removable impingement disk disposed within a top of said cooking chamber and a second driven rotating removable impingement disk disposed within a bottom of said cooking chamber, said impingement disks disposed relatively parallel to said product support surface, said disks comprising a plurality of generally circular, round edged air impingement orifices for providing air flow communication between said plenum and said cooking chamber; and
   damper means for controlling air flow within said plenum and through said orifices.

2. The rotary air impingement oven defined in claim 1 wherein said oven housing comprises a removable door operatively sealing and allowing access to said cooking chamber.

3. The rotary air impingement oven defined in claim 2 wherein said cooking chamber comprises an air intake to provide air flow communication between said cooking chamber and said fan means.

4. The rotary air impingement oven defined in claim 3 further comprising radiant cooking means for browning and heating the surface of said product, said radiant cooking means dispose within said plenum above said first impingement disk.

5. The rotary air impingement oven defined in claim 4 wherein said cooking chamber has a reflective surface to promote radiant heat transfer.

6. The rotary air impingement oven defined in claim 5 wherein said impingement disks each comprise a central hub, said hub defining a cavity to receive a drive shaft, said cavity defining a slot to receive a pin extending from said drive shaft.

7. The rotary air impingement oven defined in claim 6 wherein said slot in said second disk is generally J-shaped and said drive shaft comprises spring loaded biasing means to provide one-quarter turn locking and release of said second disk.

8. The rotary air impingement oven defined in claim 7 further comprising boiler for steaming within said oven.

9. A closed loop, rotary air impingement oven comprising:
   an oven housing;
   variable speed fan means for providing pressurized air;
   a removable cooking chamber defined within said oven housing, said cooking chamber comprising:
      a top comprising a generally circular opening for receiving a first removable, driven rotating impingement disk, said first impingement disk defining a plurality of round edged, generally circular air impingement orifices;
      a bottom comprising a generally circular opening for receiving a second removable, driven rotating impingement disk, said second impingement disk defining a plurality of round edged generally circular air impingement orifices;
      two opposite side walls removably mounting at least one product support surface relatively parallel to said disks; and,
      a rear wall comprising an air intake to provide air flow communication between said cooking chamber and said fan means;
   a front door comprising an outer panel, an inner panel and an insulated portion therebetween, said front door mounted in operative cooperation with said oven housing to selectively seal and provide access to said cooking chamber;
   a hot air plenum defined between said oven housing and said cooking chamber for providing air flow communication between said fan means and said impingement disks, said plenum comprising damper means for controlling air flow within said plenum and through said orifices; and,
   heater means for heating said pressurized air, said heater means disposed within said plenum and further comprising turning vanes to reduce turbulence in said pressurized air.

10. The rotary air impingement oven defined in claim 9 further comprising radiant cooking means for browning and heating the surface of said product, said radiant cooking means disposed within said plenum above said first impingement disk.

11. The rotary air impingement oven defined in claim 10 wherein said cooking chamber has a reflective surface to promote radiant heat transfer.

12. The rotary air impingement oven defined in claim 11 wherein said impingement disks each comprise a central hub, said hub defining a cavity to receive a drive shaft, said cavity defining a slot to receive a pin extending from said drive shaft, said slot in said second disk having a generally J shape and said drive shaft receiving said second disk comprising spring loaded biasing means to provide one-quarter turn locking and release of said second disk.

13. The rotary air impingement oven defined in claim 12 further comprising boiler for steaming within said oven.

14. A combination radiant heat, convection and rotary air impingement closed loop oven comprising:
   an oven housing;
   variable speed fan means for providing pressurized air;
   a removable cooking chamber defined within said oven housing, said cooking chamber comprising:
      a top comprising a generally circular opening for receiving a first removable driven rotating impingement disk, said first impingement disk comprising a plurality of round edged, generally circular air impingement orifices;
      a bottom comprising a generally circular opening for receiving a second removable driven rotating impingement disk, said second impingement disk comprising a plurality of round edged, generally circular air impingement orifices;

two opposite side walls removably mounting at least one product support surface relatively parallel to said disks;

a rear wall comprising an air intake to provide air flow communication between said cooking chamber and said fan means a from door comprising an outer panel, an inner panel and an insulated portion defined therebetween, said door in operative cooperation with said oven housing sealing and providing access to said cooking chamber;

a hot air plenum defined between said oven housing and said cooking chamber for providing air flow communication between said fan means and said impingement disks, said plenum comprising damper means for controlling air flow within said plenum and through said orifices;

heater means for heating said pressurized air within said plenum, said heater means disposed within said plenum and further comprising turning vanes to reduce turbulence in said pressurized air; and, radiant cooking means for browning and heating the surface of said product, said radiant cooking means disposed within said plenum above said first impingement disk.

15. The rotary air impingement oven defined in claim 14 wherein said impingement disks each comprise a central hub, said hub defining a cavity to receive a drive shaft, said cavity defining a slot to receive a pin extending from said drive shaft, said slot in said second disk having a generally J shape and said drive shaft receiving said second disk comprising spring loaded biasing means to provide one-quarter turn locking and release of said second disk.

16. The rotary air impingement oven defined in claim 15 wherein said cooking chamber has a reflective surface to promote radiant heat transfer.

17. The rotary air impingement oven defined in claim 16 further comprising boiler for steaming within said oven.

* * * * *